United States Patent
Lewis

(10) Patent No.: US 7,322,373 B2
(45) Date of Patent: Jan. 29, 2008

(54) HIGH ACCURACY LOW LEAKAGE VALVE FOR HIGH PRESSURE APPLICATIONS

(75) Inventor: Steven A. Lewis, South Bend, IN (US)

(73) Assignee: Honeywell International, Inc., Morristown, NJ (US)

( * ) Notice: Subject to any disclaimer, the term of this patent is extended or adjusted under 35 U.S.C. 154(b) by 267 days.

(21) Appl. No.: 10/861,959

(22) Filed: Jun. 4, 2004

(65) Prior Publication Data

US 2007/0272315 A1    Nov. 29, 2007

Related U.S. Application Data

(60) Provisional application No. 60/492,301, filed on Aug. 5, 2003.

(51) Int. Cl.
*F02C 7/232* (2006.01)

(52) U.S. Cl. .................... 137/516.29; 137/538

(58) Field of Classification Search ............... 137/512, 137/492.5, 494, 538; 251/25
See application file for complete search history.

(56) References Cited

U.S. PATENT DOCUMENTS

| | | | |
|---|---|---|---|
| 2,665,704 A * | 1/1954 | Kanuch ................. 137/110 |
| 3,005,468 A * | 10/1961 | Erwin et al. ........... 137/625.31 |
| 3,085,588 A | 4/1963 | Oliphant et al. |
| 3,092,133 A * | 6/1963 | Clark ..................... 137/220 |
| 3,339,574 A | 9/1967 | Erb et al. |
| 3,497,004 A * | 2/1970 | Page, Sr. ................ 251/63 |
| 3,514,948 A | 6/1970 | Warne |
| 4,746,093 A * | 5/1988 | Scanderbeg .............. 251/30.04 |
| 4,876,857 A | 10/1989 | Feltz et al. |
| 5,003,771 A | 4/1991 | Kester et al. |
| 5,170,626 A * | 12/1992 | Ohtaki et al. ............ 60/468 |
| 5,501,245 A | 3/1996 | Lechevalier |
| 5,639,066 A * | 6/1997 | Lambert et al. .......... 251/282 |
| 5,918,635 A * | 7/1999 | Wang et al. ............. 138/625.65 |
| 6,250,602 B1 | 6/2001 | Jansen |
| 6,328,056 B1 | 12/2001 | Kumar et al. |
| 6,567,013 B1 * | 5/2003 | Purkis et al. ............ 166/72 |
| 6,918,409 B1 * | 7/2005 | Parker ................... 137/614.11 |
| 2002/0038540 A1 | 4/2002 | Griffiths et al. |

* cited by examiner

*Primary Examiner*—Cloud K. Lee
(74) *Attorney, Agent, or Firm*—Ingrassia Fisher & Lorenz P.C.

(57) ABSTRACT

A high pressure valve assembly (10) comprising a valve sleeve (14) and a valve body (16) slidably mounted in the valve sleeve (14) is disclosed, the valve body (16) and valve sleeve (14) each having first ends (18, 56) and second ends (20, 58). A sidewall (22) extends between the valve sleeve first end (18) and second end (20) which sidewall (22) has an inner surface (24) and an outer surface (26) and at least one opening (30) therethrough. The sidewall (22) also includes at least one channel (40) having a first end (42) facing the inner surface (24) at a first location closer to the first valve sleeve end (18) than to the second valve sleeve end (20) and a second end (44) facing the inner surface (24) at a second location closer to the second valve sleeve end (20) than to the first valve sleeve end (18). A method of using the valve assembly (10) is also disclosed.

16 Claims, 6 Drawing Sheets

HIGH ACCURACY LOW LEAKAGE VALVE FOR HIGH PRESSURE APPLICATIONS

CROSS-REFERENCE TO RELATED APPLICATIONS

The present application claims the benefit of U.S. Provisional Patent Application No. 60/492,301, filed Aug. 5, 2003, the entire contents of which is hereby incorporated by reference.

This invention was made with Government support under Contract No. N00019-02-C-3003 awarded by the United States Navy. The Government has certain rights in this invention.

FIELD OF THE INVENTION

This invention relates to a valve for high pressure applications, and, more specifically, to a valve for a high pressure fluid metering system that reduces matched clearance leakage between a valve body and a valve sleeve.

BACKGROUND OF THE INVENTION

Fluid metering systems requiring high accuracy flow, such as fuel metering systems for gas turbine engines, often use a servo-controlled throttling valve to maintain a constant pressure delta (head pressure) across a metering orifice. In such systems, a supply of burn fuel is directed against a first side of a throttling valve, and the position of a valve body in the throttling valve controls the amount of fuel that leaves the valve outlet.

A servo may be used to create a control pressure ("PX pressure") for positioning the valve body to vary the flow rate through the valve. In high pressure systems, the fluid conveying the control pressure against the valve body may leak between the valve body and the valve sleeve and into the valve outlet. This "matched clearance servo leakage," adds to the amount of servo flow required for the valve to hold position, as well as, adding to the measured volume of burn fuel that passes through the valve outlet. Because this leakage is somewhat unpredictable it varies with temperature and operating conditions, for example, it is often a large contributor to metering system inaccuracy.

In order to control matched clearance leakage, one known throttling valve includes a dual outer diameter valve body and a dual inner diameter valve sleeve. FIG. 6 illustrates a conventional dual-diameter throttle valve assembly 210 comprising a valve housing 212 and a valve sleeve 214 in which a valve body 216 is slidably mounted. Valve sleeve 214 includes a first inner diameter 218 and a second inner diameter 220 while valve body 216 includes a first outer diameter 222 corresponding to valve sleeve first inner diameter 218 and a second outer diameter 224 corresponding to valve sleeve second inner diameter 220. Seals 226 and 270 control leakage from the supply flow path 286 and a leakage control port 228 during shutoff. The leakage control port 228 ports supply pressure to a center area between the valve body and the valve sleeve to reduce the pressure differential between the control pressure flow path 290 and the outlet flow path 288 to reduce servo leakage.

System requirements typically call for drip-tight shutoff leakage on throttle valves. Not only is the dual-diameter matched valve assembly expensive to manufacture, but it is extremely difficult to achieve the low leakage or drip-tight shutoff sealing required in some applications with this valve. In the dual-diameter configuration, it is also extremely difficult to install a durable drip-tight seal in the upper seal diameter, because the seal 226 must be stretched when it is installed and re-sized after installation. Moreover, burn fuel from the supply flow path 286 which supplies flow to leakage control port 228, tends to contain more impurities than fuel from the control supply flow path 290 which has generally been more thoroughly filtered. Seal 226 is exposed to the burn fuel, and these impurities may tend to collect around seal 226, thus degrading performance of the seal and interfering with a drip-tight shutoff. It is therefore desirable to provide a valve assembly that does not suffer from the above-described shortcomings.

SUMMARY OF THE INVENTION

These shortcomings and others are addressed by the present invention which, in a first aspect, comprises a valve assembly of a fluid metering system. According to another aspect, the present invention is directed to a fluid metering system using a valve assembly described herein. One embodiment of the present invention utilizes a valve assembly with a channel in the valve sleeve to port metered flow pressure to an annulus to reduce the servo side matched clearance leakage to near zero. In one implementation, the valve of the valve assembly has a single diameter. This single diameter valve approach opens up numerous options, particularly for the upper seal design, making it much easier to achieve low leakage or drip-tight shutoff.

Another aspect of the invention comprises a high pressure valve having a valve sleeve and a valve body slidably mounted in the valve sleeve. A sidewall extends between the first and second ends of the valve sleeve and has an inner surface, an outer surface and at least one opening therethrough. The sidewall also includes at least one channel having a first end facing the inner surface at a first location closer to the first valve sleeve end than to the second valve sleeve end and a second end facing the inner surface at a second location closer to the second valve sleeve end than to the first valve sleeve end.

An additional aspect of the invention comprises a gas turbine engine throttle valve assembly including a throttle valve having a first end and a second end and comprising a valve sleeve and a valve body slidably mounted in the valve sleeve. A supply flow path delivers a supply fuel flow against the first end of the throttle valve to shift it between a first position blocking the at least one opening in the sidewall and a second position exposing at least a portion of the at least one opening to the supply fuel flow. A control flow path delivers a control fluid against the second end of the throttle valve and into a space between the valve body and a circumferential end section of the valve sleeve when the valve body is in the second position. The valve also includes a passage allowing communication between the supply fuel flow and the space between the valve body and the valve sleeve circumferential end section when the valve body is in the second position and substantially preventing communication between the supply fuel flow and that space when the valve body is in the first position.

Another aspect of the invention comprises a method of controlling fuel flow in a gas turbine engine that includes providing a throttle valve comprising a valve sleeve and a single diameter valve body slidably mounted in the valve sleeve. The valve sleeve has a sidewall comprising a first end and a second end, a central circumferential section including at least one opening, a first circumferential section lying between the first end and the central circumferential section and a second circumferential section lying between the second end and the central circumferential section. A supply fuel under pressure is directed against the first end of the throttle valve and a control fluid under pressure is directed against the second end of the throttle valve and into a space between the valve body and the valve sleeve second circumferential section. The valve body is shifted from a first position blocking the at least one opening to a second position exposing at least a portion of the at least one opening to the supply fuel. A portion of the supply fuel is allowed to enter the space between the valve body and the second circumferential section when the valve is in the second position.

In another aspect, the invention comprises a method of controlling a gas turbine engine throttle valve outlet flow that involves providing a throttle valve comprising a valve sleeve and a single diameter valve body slidably mounted in the valve sleeve. The valve sleeve has a sidewall having a first end and a second end, a central circumferential section including at least one opening, a first circumferential section lying between the first end and the central circumferential section and a second circumferential section lying between the second end and the central circumferential section. A supply fuel under pressure is directed against the first end of the throttle valve and a control fluid under pressure is directed against the second end of the throttle valve and into a space between the valve body and the valve sleeve second circumferential section. Fluid flow through the at least one opening is prevented by shifting the valve body into a first position and fluid flow is allowed through a passageway connecting the first circumferential section to the second circumferential section when the valve body is in the second position.

BRIEF DESCRIPTION OF THE DRAWINGS

The above and other aspects and features of the invention will be better understood after a reading of the following detailed description of the invention in connection with the drawings wherein.

DETAILED DESCRIPTION

Figure 1:
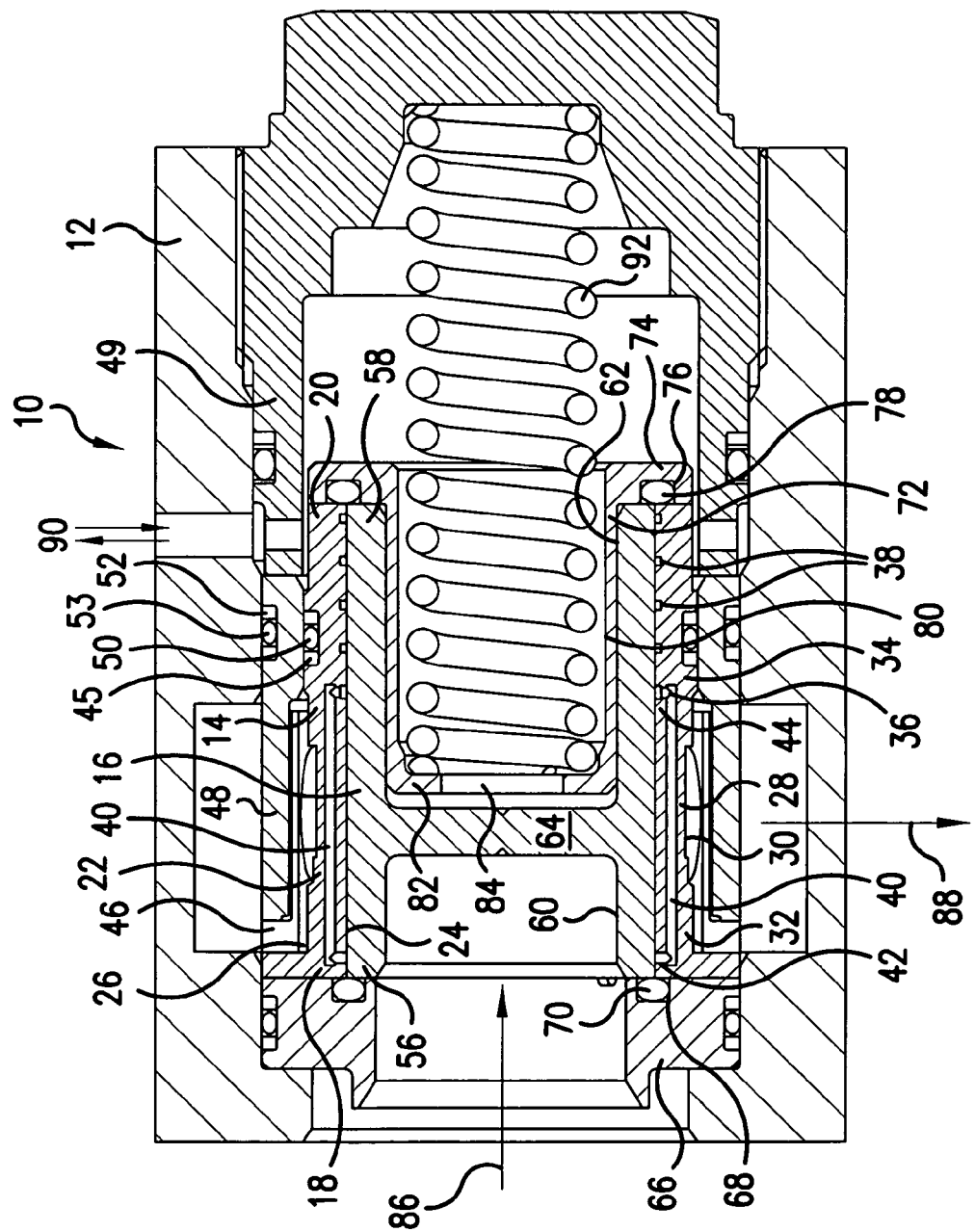
FIG. 1 is a cross sectional view of a valve according to a first embodiment of the present invention in a first, closed position.

Referring now to the drawings, wherein the showings are for purposes of illustrating preferred embodiments of the invention only, and not for purposes of limiting same, FIG. 1 shows a valve assembly 10 comprising a valve housing 12 and a valve sleeve 14 in which a valve body 16 is slidably mounted. Valve sleeve 14 includes a first end 18 and a second end 20 and a sidewall 22 extending between first end 18 and second end 20 having an inner wall 24 and an outer wall 26. A central circumferential sidewall section 28 includes a plurality of openings 30 that extend completely through side wall 22. Valve sleeve sidewall 22 further include a first circumferential section 32 extending from first end 18 of valve sleeve 14 to second circumferential section 28 and a second circumferential section 34 between second end 20 of valve sleeve 14 and central circumferential section 28.

Figure 4:
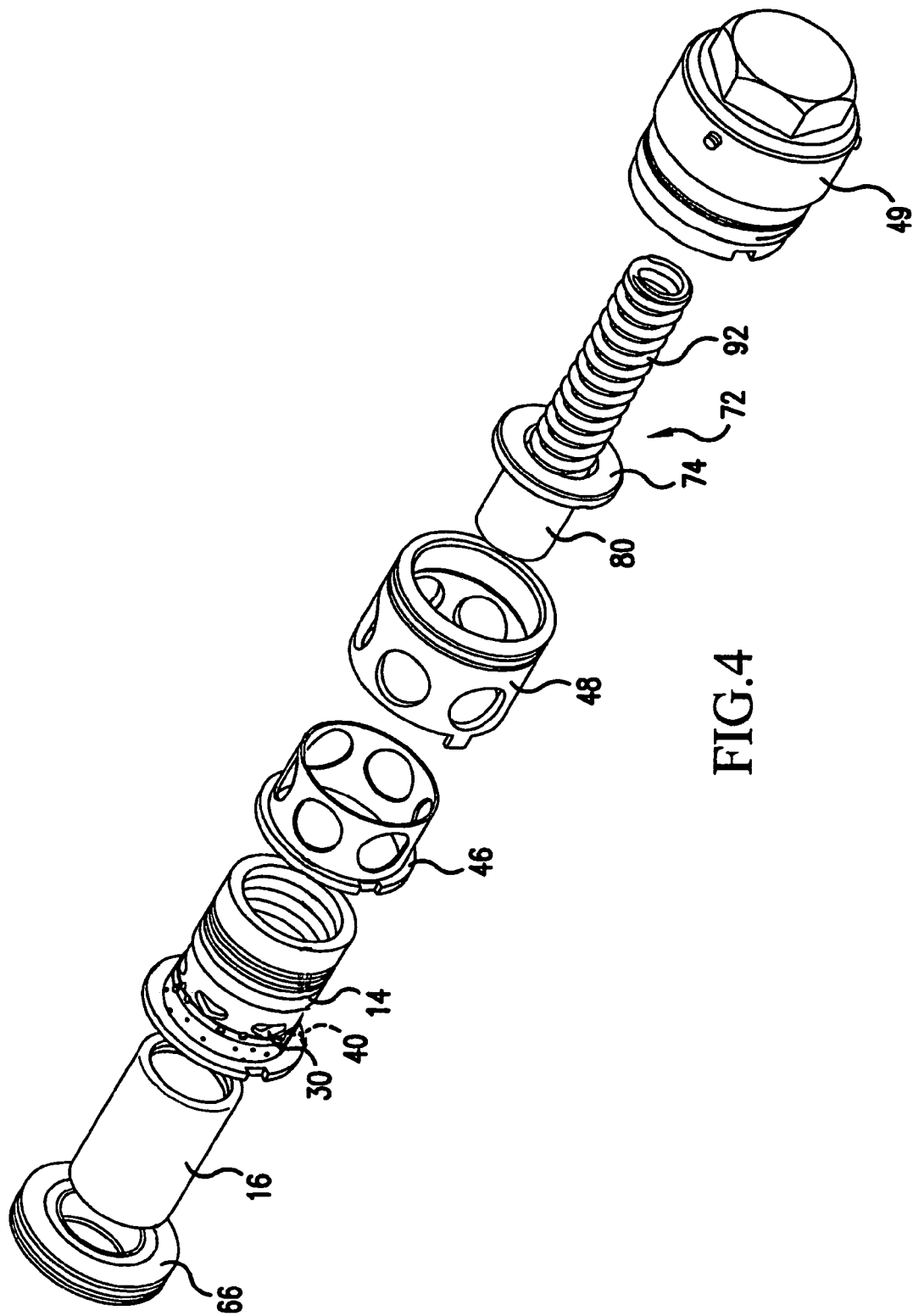
FIG. 4 is an exploded perspective view of the valve of FIGS. 1-3.

Several circumferential grooves are formed in inner wall 24 of valve sleeve 14 including a primary circumferential groove 36 and several auxiliary circumferential grooves 38. Side wall 22 further includes a leakage control channel 40 having a first end 42 extending through inner wall 24 in first circumferential section 32 and a second end 44 extending through inner wall 24 in second circumferential section 34. A plurality of these channels 40 are provided between pairs of openings 30; only one is visible in FIGS. 1 and 4.

Valve assembly 10 further includes a flow deflector 46 surrounding valve sleeve 14. A spacer 48 surrounds flow deflector 46 and a portion of valve sleeve 14, and an O-ring seal 50 is provided in a channel 45 in outer wall 26 of valve sleeve 14. Cover 49 helps retain these elements in valve housing 12. The spacer 48 also includes a channel 52 in which a seal 53 for forming a seal between spacer 48 and valve housing 12 is provided.

Valve body 16 has a first end 56 and a second end 58, a first bore 60 extending into first end 56, and a second bore 62 extending into second end 58. A wall 64 separates first bore 60 from second bore 62.

Valve assembly 10 further comprises a lower seal seat 66 that includes a channel 68 retaining a seal 70. First end 18 of valve sleeve 14 engages lower seal seat 66, and first end 56 of valve body 16 engages seal 70 when the valve assembly 10 is in a first, or closed, configuration shown in FIG. 1. Valve assembly 10 also includes an upper seal seat 72, which may be formed of Teflon, for example, that includes an annular portion 74 having a channel 76 holding a seal 78 and a projecting portion 80 extending into second bore 62 in valve body 16 that includes an end wall 82 having an opening 84.

A supply flow path 86 brings a supply of burn fuel to valve assembly 10, which burn fuel exits the valve assembly 10 along an outlet path 88. A control fluid is directed against the second end of the valve assembly 10 via a control flow path 90. In one specific implementation of the principles of the present invention, the valve assembly 10 is designed for operation at supply flow path pressures of approximately 2000 psig with an outlet flow path pressure of approximately 50 psig. A typical, conventional, single diameter valve for such an application would have matched clearance leakage from the control flow path 90 to the outlet flow path 88 ranging from 15 pph to 120 pph depending on tolerances and temperature conditions. A conventional single diameter valve would not only be inaccurate, but might also fail to function under these extreme conditions.

In operation, a control fluid provided via control flow path 90 is directed against the second end of the valve sleeve 14. The force of the control fluid, together with the force provided by biasing spring 92 which extends between upper seal seat 72 and cover 49, biases valve body 16 in a first direction toward lower seal seat 66, to the left as viewed in FIG. 1. Supply or burn fuel is provided via supply flow path 86 against first end 56 of valve body 16 which pressure is greater than the control pressure, and therefore tends to move valve body 16 in a second direction, toward the right as viewed in FIG. 1. As valve body 16 moves in the second direction, first end 56 of valve body 16 moves past first end 42 of leakage control channel 40 into the position illustrated in FIG. 2, and allows the supply or burn fuel to flow through leakage control channel 40 from first circumferential section 32 to primary circumferential groove 36 in second circumferential section 34. As valve body 16 continues to move in the second direction, first end 56 of the valve body 16 passes an edge of opening 30 in side wall 22 of valve sleeve 14, as illustrated in FIG. 3, and allows the supply fuel flow to pass through opening 30 and into the outlet flow path 88.

Figure 2:
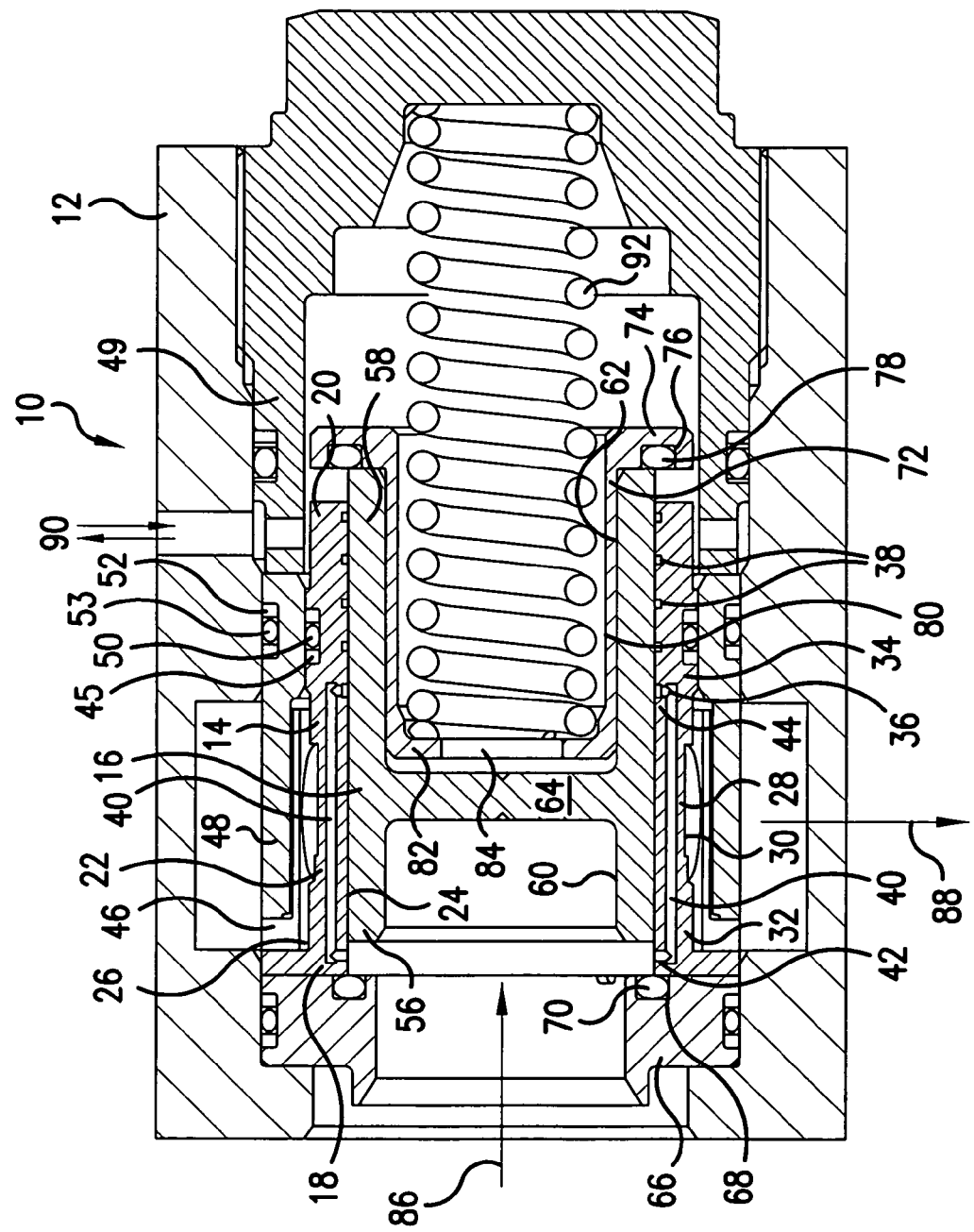
FIG. 2 is a cross sectional view of the valve of FIG. 1 in a second, partially open position.
Figure 3:
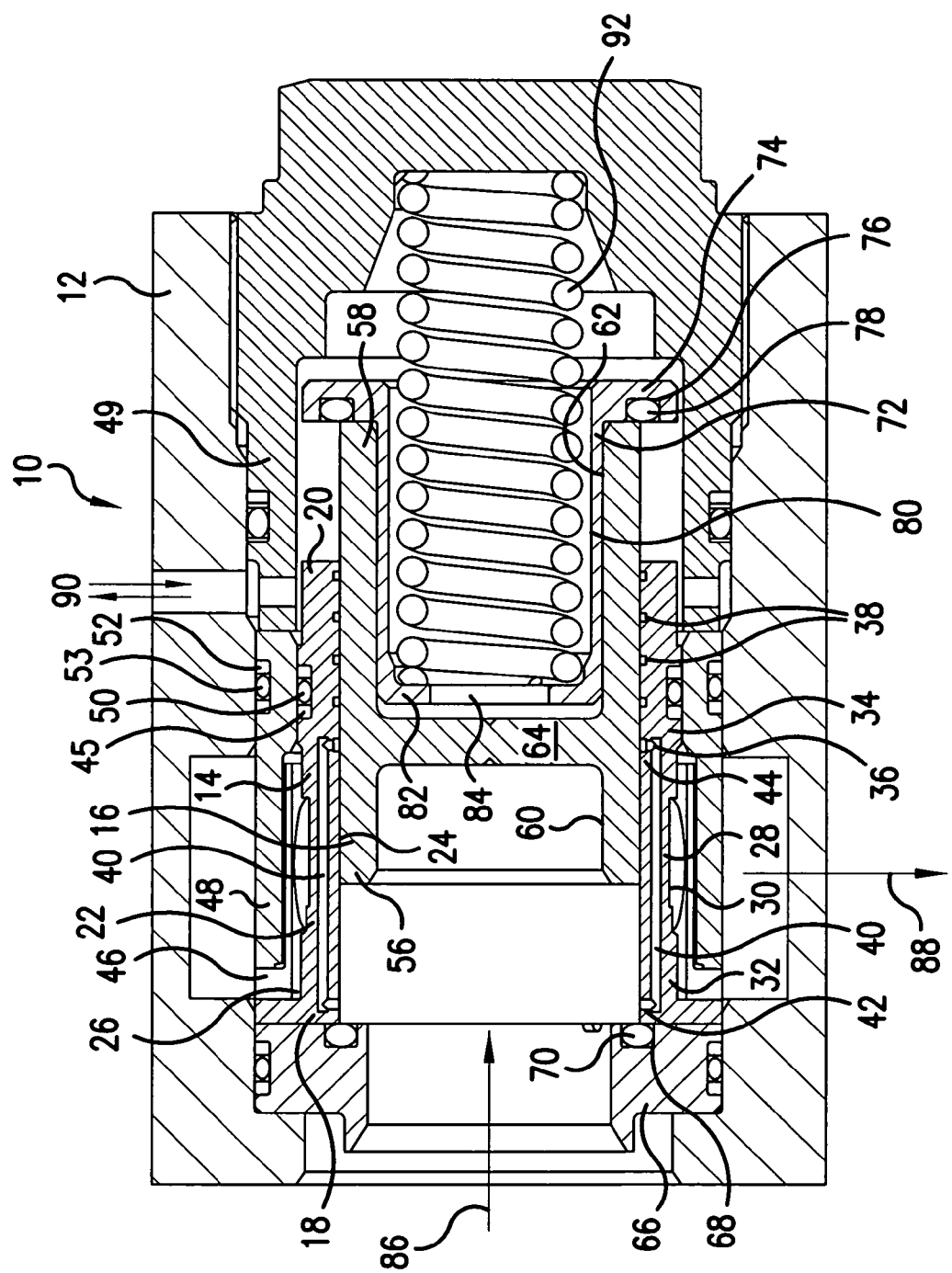
FIG. 3 is a cross sectional view the valve of FIG. 1 in a third, open position.

As will be appreciated from FIGS. 1-3, as valve body 16 moves in a second direction, it forces annular portion 74 of upper seal seat 72 away from engagement with valve sleeve 14. The junction between valve body 16 and valve sleeve 14 is therefore exposed to the high pressure control fluid in control fluid flow path 90. While the outer diameter of valve body 16 is substantially identical to the inner diameter of valve sleeve 14, high pressure control fluid tends to leak between these two elements and into auxiliary circumferential grooves 38. High pressure burn fuel, however, begins filling primary circumferential channel 36 soon after valve body 16 lifts off lower seal seat 66. The presence of this supply fluid in primary circumferential groove 36 reduces the pressure difference between control flow path 90 and the space between valve body 26 and central circumferential section 28 of valve sleeve 14 enough to substantially prevent control fluid from leaking from control flow path 90 into output flow path 88. In one embodiment of the invention, the pressure difference between the control flow path 90 and the outlet flow path 88 is reduced to about 40 psi which produces a leakage of about 3 pph. Moreover, any fluid that leaks from primary circumferential channel 36 into the space between central circumferential section 28 and valve sleeve 14 will come from leakage control channel 40, and thus will comprise a portion of supply fuel arriving from supply flow path 86, which has already been metered. This leakage will therefore not adversely affect the flow rate through outlet flow path 88.

To stop fuel flow through outlet flow path 88, the control pressure in control flow path 90 is increased to drive upper seal seat 72 in the first direction until seal 78 engages the junction between valve body 16 and valve sleeve 14 and valve body 16 first end 56 engages seal 70 in lower seal seat 66 as illustrated in FIG. 1. This provides for drip-tight shut off by valve assembly 10, a substantial improvement over the prior art.

Figure 5:
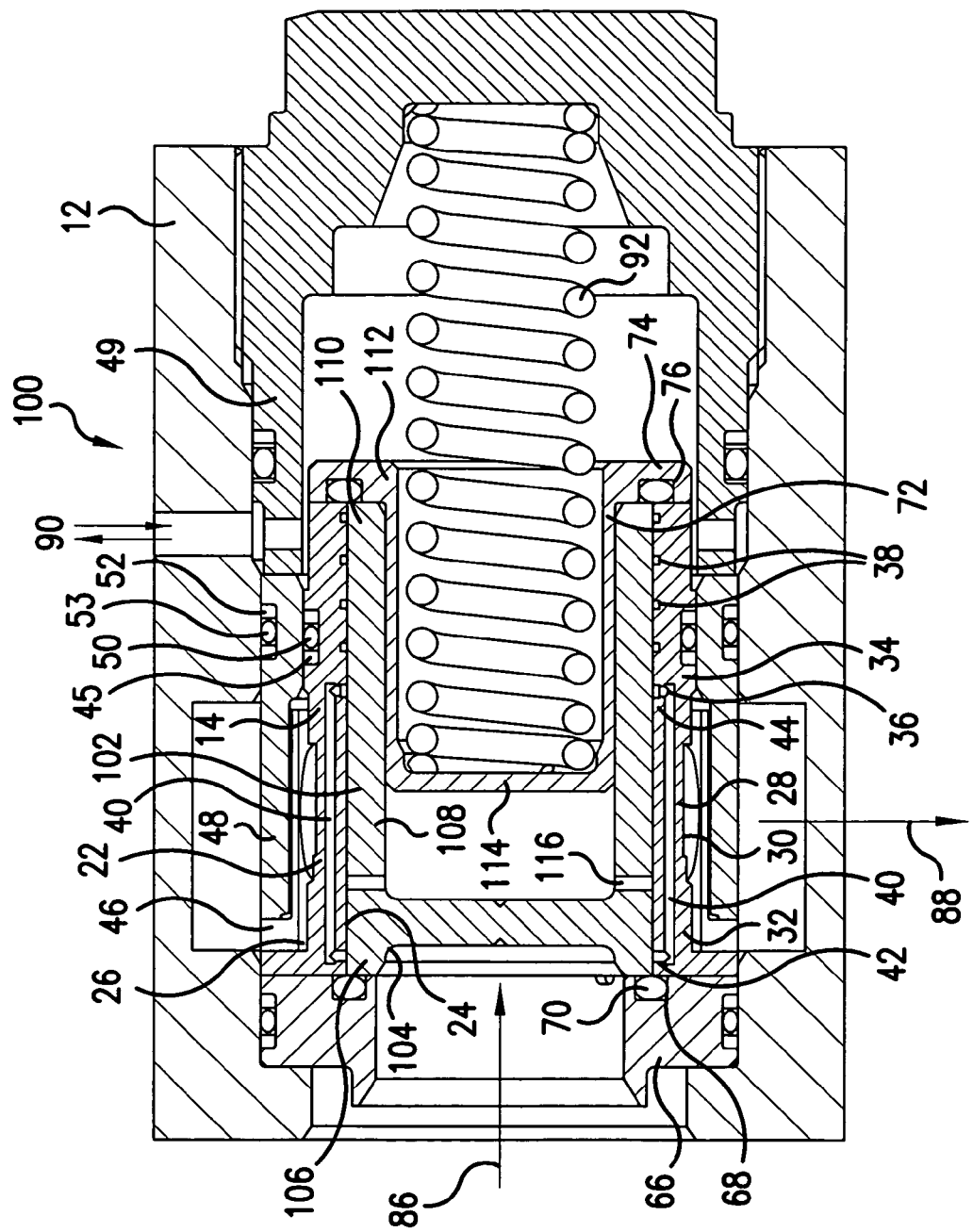
FIG. 5 is a cross sectional view of a valve according to a second embodiment of the present invention.
Figure 6:
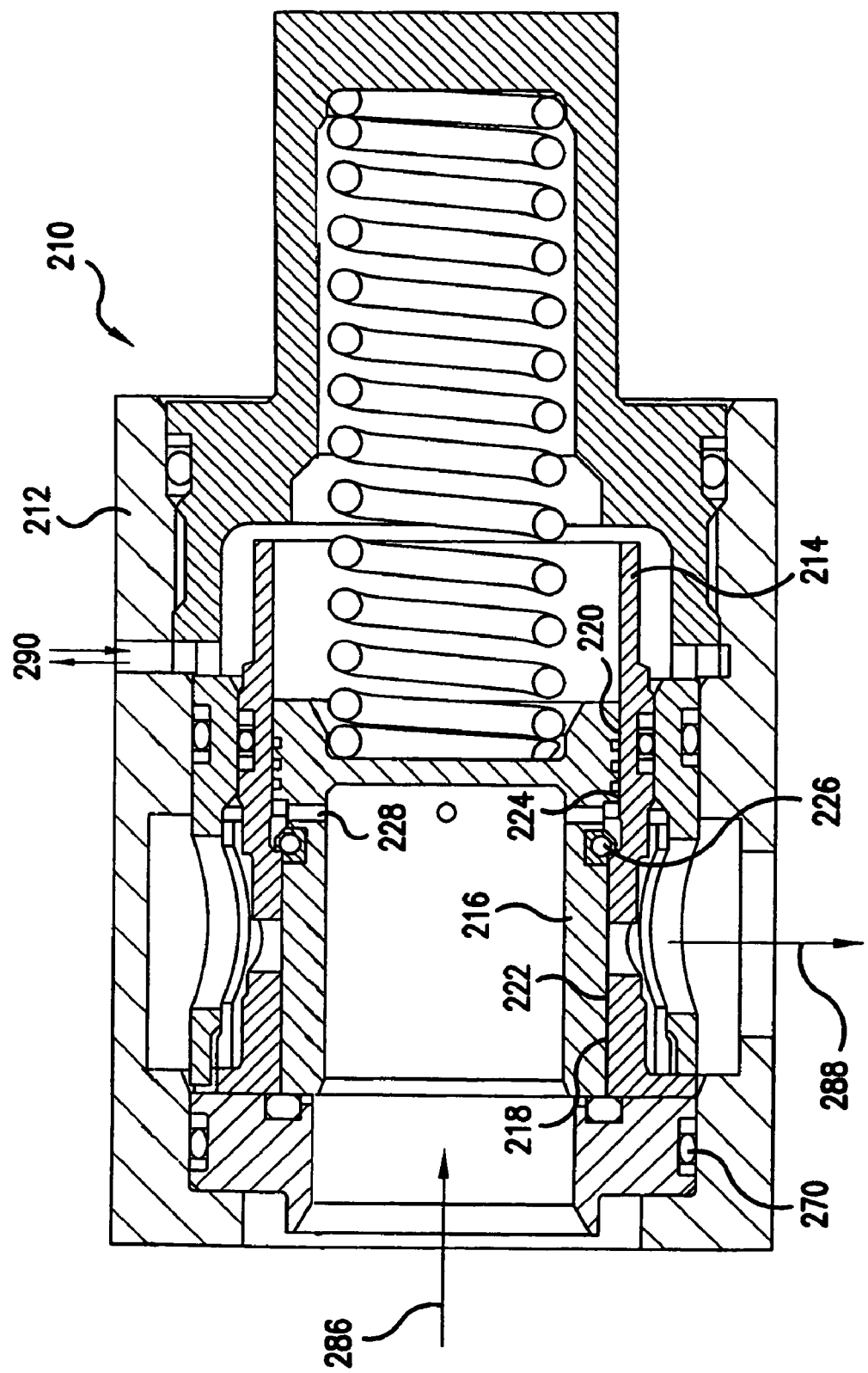
FIG. 6 is a cross sectional view of a conventional dual-diameter valve.

A second embodiment of the subject invention is shown in FIG. 5 wherein like numerals are used to identify parts identical to the first embodiment. Valve assembly 100 shown in FIG. 3 includes a valve body 102 having a first bore 104 in a first end 106 substantially shallower that first bore 60 in the valve body 16 of the first embodiment, and a second bore 108 in a second end 110 of the valve body 102 that is substantially deeper than second bore 62 of valve body 16 of the first embodiment. In this embodiment, the seal seat 112 includes an end wall 114 that, unlike end wall 82 of the upper seal seat 72 of the first embodiment, lacks a through opening. Pressure channels 116 are provided in the side walls of valve body 102. This embodiment ports the relatively low outlet pressure 88 between the seal seat 112 and the valve body 102. The low pressure in this area increases the clamping force between the seal seat 112 and the valve body 102, as well as, improving the seal retention and valve deflection.

While the subject invention has been described in terms of specific embodiment, obvious variations will become apparent to those skilled in the relevant arts and such variations comprise a part of the subject invention to the extent they fall within the scope of the several claims appended hereto.

What is claimed is:

1. A high pressure valve comprising a valve sleeve and a valve body slidably mounted in said valve sleeve, said valve body comprising first and second ends, and said valve sleeve comprising first and second ends, a sidewall extending between said valve sleeve first and second ends and having an inner surface and an outer surface, at least one opening through said sidewall, and at least one channel in said sidewall having a first channel end in said inner surface at a first location between said at least one opening and said valve sleeve first end and a second channel end in said inner surface at a second location between said valve sleeve second end and said at least one opening;

wherein said valve body is configured to translate within said valve sleeve between: (i) a first position in which said valve body covers said first channel end, and (ii) a second position in which said valve body does not cover said first channel end.

2. The high pressure valve of claim 1 wherein said at least one channel extends in an axial direction relative to the valve sleeve.

3. The high pressure valve of claim 1 including a circumferentially extending groove in said inner surface disposed between said opening and said second valve sleeve end.

4. The high pressure valve of claim 3 wherein said second channel end includes a portion of said circumferentially extending groove.

5. The high pressure valve of claim 1 wherein said at least one opening through the sidewall comprises a plurality of openings and wherein said at least one channel extends between a pair of said plurality of openings.

6. The high pressure valve of claim 1 wherein said valve body has a substantially constant outer diameter.

7. The high pressure valve of claim 1 wherein said valve sleeve has a substantially constant inner diameter.

8. The high pressure valve of claim 1 wherein said valve body has a generally H-shaped longitudinal cross section.

9. The high pressure valve of claim 1 wherein said valve body includes a first bore in said first end, a second bore in said second end, a wall separating said first bore from said second bore and a biasing spring extending into said second bore.

10. The high pressure valve of claim 9 including an upper seal seat supporting an upper seal and extending into said second bore.

11. The high pressure valve of claim 10 wherein said upper seal seat includes an opening facing said wall.

12. The high pressure valve of claim 1 including a lower seal seat engaging said valve sleeve, wherein said valve body is shiftable between a first position in sealing engagement with said lower seal seat and a second position spaced from said lower seal seat.

13. The high pressure valve of claim 12 including an upper seal engaging said valve body second end and said valve sleeve second end when said valve body is in said first position.

14. The high pressure valve of claim 12 wherein said valve body has a first length and said valve sleeve has a second length substantially equal to said first length.

15. The high pressure valve of claim 1 wherein said at least one channel comprises at least one enclosed passageway between said first channel end and said second channel end.

16. A high pressure valve comprising:
a valve sleeve and a valve body slidably mounted in said valve sleeve,
said valve body comprising first and second ends and having a substantially constant outer diameter, and said valve sleeve comprising first and second ends, a sidewall extending between said valve sleeve first and second ends and having an inner surface and an outer surface, a plurality of openings through said sidewall, and a channel extending in an axial direction in said sidewall between a different pair of said plurality of openings, the channel having a first channel end facing said inner surface at a first location closer to said first valve sleeve end than to said second valve sleeve end and a second channel end facing said inner surface at a second location closer to said second valve sleeve end than to said first valve sleeve end and located in a circumferentially extending groove in said sidewall;

wherein said valve body is configured to translate within said valve sleeve between: (i) closed position wherein said valve body obstructs fluid flow into said first channel end and through said plurality of openings, and (ii) an open position wherein said valve body does not obstruct fluid flow into said first channel end and through said plurality of openings.

\* \* \* \* \*